United States Patent [19]

Tsumura et al.

[11] Patent Number: 5,070,175
[45] Date of Patent: Dec. 3, 1991

[54] METHOD FOR THE PREPARATION OF AN ORGANOPOLYSILOXANE CONTAINING TETRAFUNCTIONAL SILOXANE UNITS

[75] Inventors: Hiroshi Tsumura; Kiyoyuki Mutoh, both of Gunma; Kazushi Satoh, Tokyo; Ken-ichi Isobe, Gunma, all of Japan

[73] Assignee: Shin-Etsu Chemical Co., Ltd., Tokyo, Japan

[21] Appl. No.: 706,148

[22] Filed: May 28, 1991

[30] Foreign Application Priority Data

May 29, 1990 [JP] Japan ................................ 2-139119

[51] Int. Cl.$^5$ ............................................. C08G 77/06
[52] U.S. Cl. ........................................ 528/12; 528/10; 528/21; 528/23; 528/34; 528/36
[58] Field of Search ....................... 528/10, 12, 21, 23, 528/34, 36

[56] References Cited

U.S. PATENT DOCUMENTS 4,184,995 1/1980 Noble .................................. 524/398

Primary Examiner—Morton Foelak
Attorney, Agent, or Firm—Millen, White & Zelano

[57] ABSTRACT

An efficient and economically advantageous method is proposed for the preparation of an organopolysiloxane comprising tetrafunctional siloxane units, i.e. Q units, and, typically, monofunctional siloxy units, i.e. M units, and useful as a reinforcing agent in silicone rubbers. The method comprises the steps of: mixing the reactants for providing the Q and M units, such as ethyl orthosilicate and trimethyl methoxy silane, in a desired molar ratio; and heating the mixture at a temperature higher by at least 10° C. than the boiling point of the mixture under normal pressure in a closed vessel in the presence of water and a catalyst such as a sulfonic acid group-containing compound. In addition to the greatly shortened reaction time and remarkably decreased contents of residual alkoxy groups and gelled matter in the product, the method is advantageous also in respect of the absence of the problems caused by the disposal of the waste water as well as the corrosiveness of hydrogen chloride unavoidably produced in the conventional prior art methods.

7 Claims, No Drawings

METHOD FOR THE PREPARATION OF AN ORGANOPOLYSILOXANE CONTAINING TETRAFUNCTIONAL SILOXANE UNITS

BACKGROUND OF THE INVENTION

The present invention relates to a method for the preparation of an organopolysiloxane or, more particularly, to a method for the preparation of an organopolysiloxane having tetrafunctional siloxane units and containing little amount of residual alkoxy groups so as to be useful as a reinforcing agent of silicone rubbers.

Among various types of organopolysiloxanes, those soluble in organic solvents and consisting of monofunctional organosiloxy units represented by the general unit formula $R_3SiO_{0.5}$, in which R is a hydrogen atom or a monovalent hydrocarbon group, referred to as the M units hereinbelow, and tetrafunctional siloxane units of the formula $SiO_2$, referred to as the Q units hereinbelow, are widely used in the art of silicone products, for example, as a reinforcing agent of silicone rubbers. Such an organopolysiloxane consisting of the M units and Q units is prepared, for example, by the method disclosed in U.S. Pat. Nos. 2,676,182 and 2,814,601, in which a water-soluble basic silicate such as sodium orthosilicate is converted into a silicic acid oligomer by the addition of hydrochloric acid or sulfuric acid followed by the reaction with a trialkyl chlorosilane.

This method, however, has several problems as an industrial process because, since the silicic acid oligomer is relatively unstable, difficulties are encountered in the control of the molecular weight distribution in the organopolysiloxane product so that the molar ratio of the M units and the Q units in the organopolysiloxane product cannot be always consistent with the target molar ratio. In addition, since the waste water coming from the process necessarily contains a large amount of the waste acid used for the neutralization of the starting basic silicate as well as the hydrochloric acid produced as a by-product in the reaction of the trialkyl chlorosilane and also a large amount of an alcohol admixed with the reaction mixture with an object of stabilization of the reaction mixture, a large cost is required for the disposal of the waste water in order not to cause the problem of environmental pollution. When the waste water contains hydrochloric acid in a substantial concentration, in particular, the hydrogen chloride gas emitted therefrom is very harmful against human health with a strong irritating odor and strong corrosion is unavoidable on the apparatuses and pipe lines as well as other auxiliary instruments in the manufacturing plant so that they must be constructed by using highly corrosion-resistant but very expensive materials in addition to the disadvantage of large man power and very high cost required for the maintenance of the plant.

Alternatively, the organopolysiloxane of this type can be prepared by the method taught in U.S. Pat. No. 2,857,356, in which an alkyl silicate and a trialkyl chlorosilane are subjected to cohydrolysis in the presence of hydrochloric acid, or by the method taught in Japanese Patent Kokai No. 61-195129, in which an alkyl silicate or a partial hydrolysis product thereof is added dropwise to a trialkyl chlorosilane in the presence of hydrochloric acid. As compared with the first described method, these methods have an advantage because the molar ratio of the M units and the Q units or the molecular weight distribution in the organopolysiloxane product can be controlled relatively easily while they have disadvantages that measures for the disposal of waste water and against the adverse effects of toxic and corrosive hydrochloric acid must be undertaken likewise as in the above described method since a large amount of hydrochloric acid must be added to the reaction mixture in addition to the hydrochloric acid produced by the reaction or the alcohol admixed in the reaction mixture.

At any rate, these known methods are each industrially disadvantageous because a large volume of acid-containing waste water must be safely disposed and the productivity is low with a relatively low yield of the organopolysiloxane product per unit reaction volume as a consequence of the use of a large volume of organic solvents as a hydrolysis aid. When an organopolysiloxane containing a large amount of the Q units or, in particular, having the molar ratio of the M units to the Q units not exceeding 2 is desired, it is a rather difficult matter to adequately control the reaction so as to obtain an organopolysiloxane having the molar ratio of the units and molecular weight distribution exactly controlled as desired. Furthermore, difficulties are encountered in the preparation of an organopolysiloxane having a controlled amount of the silanol groups or alkoxy groups with good reproducibility.

As a measure to dissolve the above described disadvantages, accordingly, a method is proposed in Japanese Patent Kokai No. 63-256628, in which an organosilane or an organosiloxane is reacted with an alkyl silicate or a partial hydrolysis product thereof in the presence of a sulfonic acid group-containing compound and/or phosphonitrile chloride as a catalyst. This method has advantages that control of the molar ratio of the M units to the Q units is relatively easy and no hydrochloric acid is produced as a by-product of the reaction. This method, however, is not free from the disadvantages that, since the reaction is conducted under atmospheric pressure, residual amount of the alkoxy groups must be removed by the addition of an excess amount of water taking a long reaction time during which gelled materials are sometimes formed in the reaction mixture resulting in very poor filtrability of the mixture with a greatly decreased productivity. When such a measure is not undertaken to leave a large amount of the residual alkoxy groups in the product, the applicability of such an organopolysiloxane product as a reinforcing agent of silicone rubbers would be low because no sufficient reinforcing effect can be obtained therewith and the mechanical strengths of the silicone rubber compounded with such an organopolysiloxane would be subject to gradual degradation in the lapse of time.

SUMMARY OF THE INVENTION

The present invention accordingly has an object to provide a novel and efficient method for the preparation of an organopolysiloxane comprising the Q units without the problems and disadvantages in the above described prior art methods.

Thus, the method of the present invention for the preparation of an organopolysiloxane containing the tetrafunctional siloxane units comprises the steps of:

(a) mixing an alkyl silicate or a partial hydrolysis product thereof as a first reactant with an organosilane compound represented by the general formula $$R_aSiX_{4-a}, \tag{I}$$

in which R is a hydrogen atom or an unsubstituted or substituted monovalent hydrocarbon group, X is an alkoxy group or a hydroxyl group and the subscript a is 1, 2 or 3, or an oligomeric organosiloxane compound consisting of the siloxane units represented by the general unit formula $$R_b SiO_{(4-b)/2}, \qquad (II)$$

in which R has the same meaning as defined above and the subscript b is 1, 2 or 3, as a second reactant to form a mixture; and (b) heating the mixture, in a pressurizable reaction vessel, in the presence of water and a sulfonic acid group-containing compound or phosphonitrile chloride as a catalyst at a temperature higher by at least 10° C. than the boiling point of the mixture under atmospheric pressure.

DETAILED DESCRIPTION OF THE PREFERRED EMBODIMENTS

As is described above, the scope of the inventive method consists in the reaction conditions in which a mixture of an alkyl silicate or a partial hydrolysis product thereof with an organosilane or organosiloxane compound is heated, in a closed pressurizable reaction vessel, in the presence of water and a specific catalyst at a temperature higher by at least 10° C. than the boiling point of the mixture under atmospheric pressure. This method is advantageous because addition of an alcohol to the reaction mixture for stabilization is not necessary and almost no gelled material is formed in the mixture during the reaction without decreasing the filtrability of the reaction mixture after completion of the reaction in addition to the unexpected advantage that the content of the residual alkoxy groups in the organopolysiloxane product can be greatly decreased.

One of the reactants in the reaction according to the inventive method is, on one hand, is an organosilane compound represented by the general formula $R_a SiX_{4-a}$, in which R is a hydrogen atom or an unsubstituted or substituted monovalent hydrocarbon group exemplified by alkyl groups such as methyl, ethyl, propyl and butyl groups, cycloalkyl groups such as cyclohexyl group, alkenyl groups such as vinyl and allyl groups and aryl groups such as phenyl and tolyl groups as well as those substituted hydrocarbon groups such as chloromethyl, 3,3,3-trifluoropropyl and 2-cyanoethyl groups obtained by replacing a part or all of the hydrogen atoms in the above named unsubstituted hydrocarbon groups with halogen atoms, cyano groups and the like, X is an alkoxy or hydroxy group and the subscript a is 1, 2 or 3. Examples of suitable organosilane compounds include trimethyl methoxy silane, trimethyl ethoxy silane, vinyl dimethyl methoxy silane, vinyl dimethyl ethoxy silane, dimethyl methoxy silane, dimethyl ethoxy silane, dimethyl dimethoxy silane, dimethyl diethoxy silane, vinyl methyl dimethoxy silane, vinyl methyl diethoxy silane and the like though not particularly limitative thereto. When the M units are essential in the organopolysiloxane product, the subscript a in the general formula should be 3 so that the organosilane compound is monofunctional having, in a molecule, only one group denoted by X as is the case in trimethyl methoxy silane.

Another reactant compound alternative to the above described organosilane compound is an oligomeric organosiloxane compound consisting of at least two organosiloxane units each represented by the general unit formula $R_b SiO_{(4-b)/2}$, in which R has the same meaning as defined above for the organosilane compound and the subscript b is 1, 2 or 3. Two kinds or more of different organosiloxane units can be contained in a molecule of the organosiloxane compound. Examples of suitable oligomeric organosiloxane compounds include hexamethyl disiloxane, 1,1,3,3-tetramethyl-1,3-divinyl disiloxane, 1,1,3,3-tetramethyl disiloxane, octamethyl cyclotetrasiloxane, 1,3,5,7-tetramethyl-1,3,5,7-tetravinyl cyclotetrasiloxane and the like though not particularly limitative thereto. These oligomeric organosiloxane compounds can be used either singly or as a combination of two kinds or more according to the desired siloxane constitution in the organopolysiloxane product. When the desired organopolysiloxane product should contain the M units, for example, an organosiloxane comprising the monofunctional siloxy units $RSiO_{0.5}$ should be used as the reactant such as hexamethyl disiloxane. When difunctional siloxane units are desired in the organopolysiloxane product, it is convenient to formulate the starting reaction mixture with a cyclic organosiloxane oligomer such as the above mentioned octamethyl cyclotetrasiloxane and 1,3,5,7-tetramethyl-1,3,5,7-tetravinyl cyclotetrasiloxane. It is optional to use the above described organosilane compound and the organosiloxane compound in combination according to need.

The other reactant to be reacted with the above described organosilane or oligomeric organosiloxane compound in the reaction mixture is an alkyl silicate exemplified by methyl orthosilicate, ethyl orthosilicate, propyl orthosilicate and the like or a partial hydrolysis product thereof such as so-called polymethyl silicate, polyethyl silicate, polypropyl silicate and the like.

The mixing ratio of the above described organosilane compound and/or organosiloxane compound as the second reactant to the alkyl silicate or partial hydrolysis product thereof as the first reactant should be adequately selected depending on the desired molar ratio of the M units to the Q units in the organopolysiloxane product.

The catalyst used for promoting the reaction according to the inventive method is a sulfonic acid group-containing compound or phosphonitrile chloride. Examples of suitable compounds having a sulfonic acid group —SO$_3$H include sulfuric acid, fuming sulfuric acid, methane sulfuric acid, sulfuric anhydride, p-toluene sulfonic acid and trifluoromethane sulfonic acid as well as a certain solid compound having a sulfonic acid group. It is optional to use a sulfonic acid group-containing compound and phosphonitrile chloride in combination according to need. The amount of the catalyst compound added to the reaction mixture is very small and can be much smaller than the amount of hydrochloric acid used as a catalyst in the conventional method. Though dependent on the desired velocity of the reaction, the amount of the catalyst added to the reaction mixture is usually in the range from 0.001 to 3% by weight based on the total amount of the organosilane compound or organosiloxane compound and the alkyl silicate or a partial hydrolysis product thereof.

If necessary, the reaction mixture can be admixed with a small amount of an organic solvent including alcohols such as methyl alcohol, ethyl alcohol, propyl alcohol and the like, aliphatic hydrocarbons such as n-hexane and the like and aromatic hydrocarbons such as benzene, toluene, xylene and the like.

The method of the present invention is conducted by introducing the above described organosilane or oligomeric organosiloxane compound, alkyl silicate or a partial hydrolysis product thereof, water and catalyst into a pressurizable reaction vessel to form a reaction mixture and heating the reaction mixture in the closed reaction vessel up to a temperature higher by at least 10° C. or, preferably, by at least 20° C. than the boiling point of the reaction mixture under normal pressure to produce a super-atmospheric pressure which is preferably in the range from 1 to 10 kg/cm$^2$G. When the reaction is undertaken under normal pressure, the reaction temperature is determined naturally by the boiling point of the mixture under normal pressure while, when the reaction is undertaken under pressurization, the reaction temperature is increased corresponding to the pressure so that the reaction can be accelerated so much.

As is mentioned before, the reaction of the inventive method is carried out in the presence of water so that the reaction mixture must contain water in a controlled amount. The amount of water added to the reaction mixture should be in the range from 0.6 to 1.5 moles per mole of the alkoxy groups in the alkyl silicate or a partial hydrolysis product thereof and in the alkoxy-containing silane compound, if used. When the amount of water is too small, a large amount of the alkoxy groups in the starting reactants would remain unreacted while, when the amount of water is increased to exceed the above mentioned upper limit, no further influences are caused on the contents of the residual alkoxy groups and hydroxy groups and on the molecular weight of the organopolysiloxane product. Namely, the amount of water in the reaction mixture as well as the reaction temperature and reaction time would determine the contents of the residual alkoxy groups and hydroxy groups as well as the molecular weight of the SiO$_2$ unit-containing organopolysiloxane product. The reaction mixture can optionally be admixed with an organic solvent according to need.

In practicing the method of the present invention by reacting the above defined organosilane or organosiloxane compound and an alkyl silicate or a partial hydrolysis product thereof in the presence of a specific catalytic compound and water under pressurization, the molar ratio of the M units to the Q units in the organopolysiloxane product is just the same as the molar ratio in the starting reaction mixture consisting of the organosilane or oligomeric organosiloxane compound providing the M units and the alkyl silicate or a partial hydrolysis product thereof providing the Q units. When the molar ratio of the M units to the Q units is smaller than 2, in particular, the advantage of the inventive method is so remarkable that the desired organopolysiloxane product, of which the molar ratio of the units can be exactly determined by the formulation of the reactant compounds in the starting reaction mixture, can be obtained in a much higher yield than in the conventional methods with a greatly decreased loss of the M units. Further, the amount of residual alkoxy groups and the amount of hydroxy groups can be controlled by the adjustment of the amount of the alkyl silicate or a partial hydrolysis product thereof in the reaction mixture, amount of the catalytic compound added to the reaction mixture, reaction pressure and reaction temperature so that the inventive method has great versatility for the preparation of various kinds of different organopolysiloxanes within a much shorter reaction time than in the conventional methods. In addition, formation of gelled matter can be almost completely prevented in the inventive method so that the reaction mixture after completion of the reaction retains good filtrability not to adversely influence the productivity. Still more advantageously, the inventive method is free from the problems of corrosion of the apparatuses and waste water disposal because no hydrogen chloride is formed in the reaction mixture as a by-product and addition of an alcohol is not required.

In the following, the method of the present invention is described in more detail by way of examples and comparative examples.

EXAMPLE 1

Into a pressure-resistant glass flask of 1 liter capacity equipped with a stirrer, thermometer, pressure gauge, dropping tube of 100 ml capacity and safety valve were introduced 130 g (0.8 mole) of hexamethyl disiloxane, 234.4 g of a partial hydrolysis product of tetramethoxy silane (Methyl Silicate 51, a product by Tama Chemical Co.) corresponding to 2 moles of SiO$_2$ units and 3 g of methane sulfonic acid to form a reaction mixture and 68 g (3.8 moles) of water were taken in the dropping tube.

The water in the dropping tube was added dropwise over a period of about 10 minutes into the reaction mixture in the flask which was under agitation at a temperature of 20°±1° C. so that the temperature of the reaction mixture was increased to 64° C. After completion of the dropwise addition of water into the mixture in the flask, the mixture was further heated up to 100° C. and agitated at this temperature for 5 hours during which the pressure inside the flask was kept constant at 2.3 to 2.4 kg/cm$^2$G. Thereafter, the flask was cooled to room temperature and released to open atmosphere. The mixture in the flask was transferred into another flask equipped with a condenser and, after neutralization with addition of a small amount of sodium hydrogencarbonate, admixed with toluene and the mixture was subjected to azeotropic distillation to remove the methyl alcohol formed as a by-product of the reaction and remaining amount of water leaving a toluene solution of the organopolysiloxane as the product.

The content of the non-volatile matter in this toluene solution was adjusted to 50% by weight with addition of a calculated amount of an additional portion of toluene. This toluene solution had a viscosity of 3.90 centistokes at 25° C. The thus obtained organopolysiloxane could be expressed by the average unit formula of [(CH$_3$)$_3$SiO$_{0.5}$]$_{0.8}$[SiO$_2$] corresponding to a molar ratio of the M units to the Q units of 0.8. The content of residual methoxy groups in this organopolysiloxane was 0.052 mole per 100 g. The yield of this organopolysiloxane was 92.8% of the theoretical value. The toluene solution thereof in a concentration of 50% had good filtrability corresponding to a filtering time of 89 seconds taken for the filtration of 100 g of the solution through a filter paper of Toyo 5A grade. The conditions of this filtration test included: thickness of the filter paper 0.22 mm; minimum diameter of retained particles 7 μm; collecting efficiency 75%; effective area for filtration 150 cm$^2$; pressure difference 2 kg/cm$^2$; and temperature 25° C.

COMPARATIVE EXAMPLE 1-1

The procedure was substantially the same as in Example 1 described above except that the reaction, which was performed in Example 1 in a closed pressure-resistant flask at 100° C., was performed in an open flask under reflux where the temperature of the reaction mixture in the flask was 64° to 67° C.

The reaction mixture after completion of the reaction was treated also in the same manner as in Example 1 to prepare a toluene solution of the organopolysiloxane product in a concentration of 50% by weight, which had a viscosity of 2.81 centistokes at 25° C. The organopolysiloxane thus obtained could be expressed by the same average unit formula as the product obtained in Example 1 to give the molar ratio of the M units to the Q units of 0.8. However, the organopolysiloxane contained 0.145 mole of the residual methoxy groups per 100 g.

COMPARATIVE EXAMPLE 1-2

The procedure was substantially the same as in Comparative Example 1-1 excepting extension of the reaction time under reflux at 64° to 67° C. up to 50 hours. At a moment after 20 hours of the reaction, the organopolysiloxane in the reaction mixture was analyzed to find that the content of the residual methoxy groups was 0.122 mole per 100 g. After 50 hours of the reaction, the reaction mixture was treated in the same manner as in Example 1 to prepare a toluene solution containing 50% by weight of the organopolysiloxane product, which had a viscosity of 2.90 centistokes at 25° C. The yield of the organopolysiloxane product was 81.9% of the theoretical value. The organopolysiloxane had a molar ratio 0.8 of the M units to the Q units but the content of the residual methoxy groups therein was 0.121 mole per 100 g indicating that extension of the reaction time over 20 hours had almost no effect of decreasing the content of the residual methoxy groups.

COMPARATIVE EXAMPLE 1-3

A 100 g portion of the 50% by weight toluene solution of the organopolysiloxane prepared in Comparative Example 1-2 was admixed with 1 g of methane sulfonic acid and 10 g of water and heated under reflux for 20 hours at a temperature of 90° to 105° C. with an object to promote hydrolysis of the residual methoxy groups and to increase the molecular weight of the organopolysiloxane to such an extent as to be equivalent to that in Example 1. Thereafter, the mixture was subjected to azeotropic distillation to remove water and methyl alcohol until the boiling point was increased up to 110° C. and the content of the non-volatile matter therein was again adjusted to 50% by weight by the addition of toluene followed by filtration.

This solution had a viscosity of 3.02 centistokes at 25° C. and the content of residual methoxy groups was 0.093 mole per 100 g of the solid content. The yield of the organopolysiloxane was 76.8% of the theoretical value. The filtrability of the 50% solution corresponded to 548 seconds of the filtering time as measured in the same manner as in Example 1.

EXAMPLE 2

Into the same pressurizable flask as used in Example 1 were introduced 114 g (0.7 mole) of hexamethyl disiloxane, 37 g (0.2 mole) of 1,1,3,3-tetramethyl-1,3-divinyl disiloxane, 300 g of a partial hydrolysis product of tetraethoxy silane (Ethyl Silicate 40, a product by Colcote Co.) corresponding to 2 moles of $SiO_2$ units and 5 g of sulfuric acid to form a reaction mixture along with filling of the dropping tube with 88 g (4.9 moles) of water.

The reaction mixture in the flask was agitated and kept at a temperature of 20°±1 ° C. and water in the dropping tube was added dropwise thereinto taking 5 minutes so that the temperature of the reaction mixture in the flask was increased up to 67° C. After completion of the dropwise addition of water, the flask was closed and the reaction mixture was agitated for 5 hours at a temperature of 115° C. to effect the reaction. The pressure inside the flask was 3.1 to 3.3 kg/cm²G throughout the reaction.

The reaction mixture after the above mentioned reaction time was treated in the same manner as in Example 1 to prepare a toluene solution containing 50% by weight of the non-volatile matter, which had a viscosity of 3.10 centistokes at 25° C. Analysis of the non-volatile matter indicated that the product was an organopolysiloxane expressed by the average unit formula of $[(CH_2=CH)(CH_3)_2SiO_{0.5}]_{0.2}[(CH_3)_3SiO_{0.5}]_{0.7}[SiO_2]$ corresponding to the molar ratio of the M units to the Q units of 0.9 and the content of residual ethoxy groups was 0.057 mole per 100 g of the non-volatile matter.

COMPARATIVE EXAMPLE 2

The formulation of the reaction mixture was the same as in Example 2 described above and the reaction mixture after completion of dropwise addition of water was heated in an open flask for 50 hours with agitation under reflux. The temperature of the reaction mixture was 76° to 78° C. throughout the reaction.

The reaction mixture after the reaction was treated in the same manner as in Example 1 to prepare a toluene solution containing 50% by weight of the non-volatile matter, which had a viscosity of 2.44 centistokes at 25° C. Analysis of the organopolysiloxane as the product indicated that the organopolysiloxane had a composition corresponding to the molar ratio of the M units to the Q units of 0.9 but the content of residual ethoxy groups was 0.143 mole per 100 g of the non-volatile matter.

EXAMPLE 3

Into the same pressurizable flask as used in Example 1 were introduced 243.6 g (1.5 moles) of hexamethyl disiloxane, 150 g (1.0 mole) of tetramethoxy silane and 5 g of methane sulfonic acid to form a reaction mixture and the dropping tube was filled with 50 g (2.8 moles) of water. The water in the dropping tube was added dropwise taking 2 hours into the reaction mixture in the flask which was chilled and kept at a temperature of −10°±1° C. by using a cooling medium.

After completion of the dropwise addition of water, the flask was closed and the reaction mixture in the flask was agitated for 5 hours at a temperature of 120° C. to effect the reaction. The pressure inside the flask was in the range from 5.5 to 5.8 kg/cm₂G throughout the reaction.

The reaction mixture after the above mentioned reaction time was treated in the same manner as in Example 1 to prepare a toluene solution containing 50% by weight of the non-volatile matter. The organopolysiloxane thus obtained had a viscosity of 14.6 centistokes at 25° C. Analysis of the solid matter as the product indicated that it was an organopolysiloxane expressed by the average unit formula of $[(CH_3)_3SiO_{0.5}]_{3.0}[SiO_2]$ corresponding to the molar ratio of the M units to the Q units of 3.0 and the content of the residual methoxy groups was 0.57 mole per 100 g of the non-volatile matter.

EXAMPLE 4

Into the same pressure-resistant flask as used in Example 1 were introduced 17.2 g (0.05 mole) of 1,3,5,7-tetramethyl-1,3,5,7-tetravinyl cyclotetrasiloxane, 14.8 g (0.05 mole) of octamethyl cyclotetrasiloxane, 152 g (1.0 mole) of tetramethoxy silane and 5 g of methane sulfonic acid to form a reaction mixture which was heated in the closed vessel at 110° C. for 5 hours under agitation. Thereafter, the reaction mixture was cooled to 20° C. and admixed with 65.0 g (0.4 mole) of hexamethyl disiloxane followed by dropwise addition of 50 g (2.8 moles) of water through the dropping tube taking 5 minutes. The reaction vessel was again closed and the reaction mixture in the flask was heated up to 120° C. where agitation was continued for 5 hours. The pressure inside the flask was 4.8 to 5.3 kg/cm²G throughout this reaction time.

The reaction mixture was cooled to room temperature and treated in the same manner as in Example 1 to prepare a toluene solution containing 50% by weight of the non-volatile matter, which had a viscosity of 2.98 centistokes at 25° C. Analysis of the non-volatile matter thus obtained indicated that this product was an organopolysiloxane expressed by the average unit formula of $[(CH_3)_3SiO_{0.5}]_{0.8}[(CH_3)_2SiO]_{0.2}[[(CH_2=CH)(CH_3)SiO]_{0.2}[SiO_2]$ and the content of the residual methoxy group was 0.059 mole per 100 g of the non-volatile matter.

What is claimed is:

1. A method for the preparation of an organopolysiloxane comprising tetrafunctional siloxane units which comprises the steps of:

(a) mixing an alkyl silicate or a partial hydrolysis product thereof as a first reactant with an organosilane compound represented by the general formula $R_aSiX_{4-a}$, in which R is a hydrogen atom or an unsubstituted or substituted monovalent hydrocarbon group, X is an alkoxy group or a hydroxyl group and the subscript a is 1, 2 or 3, or an oligomeric organosiloxane compound consisting of the siloxane units represented by the general unit formula $R_bSiO_{(4-b)/2}$, in which R has the same meaning as defined above and the subscript b is 1, 2 or 3, as a second reactant to form a mixture; and (b) heating the mixture, in a pressurizable reaction vessel, in the presence of water and a sulfonic acid group-containing compound or phosphonitrile chloride as a catalyst at a temperature higher by at least 10° C. than the boiling point of the mixture under atmospheric pressure.

2. The method for the preparation of an organopolysiloxane comprising tetrafunctional siloxane units as claimed in claim 1 in which the organosilane compound as the second reactant is selected from the class consisting of trimethyl methoxy silane, trimethyl ethoxy silane, vinyl dimethyl methoxy silane, vinyl dimethyl ethoxy silane, dimethyl methoxy silane, dimethyl ethoxy silane, dimethyl dimethoxy silane, dimethyl diethoxy silane, vinyl methyl dimethoxy silane and vinyl methyl diethoxy silane.

3. The method for the preparation of an organopolysiloxane comprising tetrafunctional siloxane units as claimed in claim 1 in which the oligomeric organosiloxane compound as the second reactant is selected from the class consisting of hexamethyl disiloxane, 1,1,3,3-tetramethyl-1,3-divinyl disiloxane, 1,1,3,3-tetramethyl disiloxane, octamethyl cyclotetrasiloxane and 1,3,5,7-tetramethyl-1,3,5,7-tetravinyl cyclotetrasiloxane.

4. The method for the preparation of an organopolysiloxane comprising tetrafunctional siloxane units as claimed in claim 1 in which the first reactant is selected from the class consisting of methyl orthosilicate, ethyl orthosilicate and partial hydrolysis products thereof.

5. The method for the preparation of an organopolysiloxane comprising tetrafunctional siloxane units as claimed in claim 1 in which the catalyst is a sulfonic acid group-containing compound selected from the class consisting of sulfuric acid, fuming sulfuric acid, methan sulfuric acid, sulfuric anhydride, p-toluene sulfonic acid and trifluoromethane sulfonic acid.

6. The method for the preparation of an organopolysiloxane comprising tetrafunctional siloxane units as claimed in claim 1 in which the amount of the catalyst is in the range from 0.001 to 3% by weight based on the total amount of the first and second reactants.

7. The method for the preparation of an organopolysiloxane comprising tetrafunctional siloxane units as claimed in claim 1 in which the amount of water is in the range from 0.6 to 1.5 moles per mole of the alkoxy groups in the first and second reactants.

* * * * *